United States Patent
Inoue et al.

(10) Patent No.: US 6,377,595 B1
(45) Date of Patent: Apr. 23, 2002

(54) PEAKING CAPACITOR LAYOUT

(75) Inventors: Hirotoshi Inoue; Yasufumi Kawasuji, both of Oyama; Tetsutarou Takano, Isehara; Takashi Matsunaga, Oyama, all of (JP)

(73) Assignee: Komatsu Ltd., Tokyo (JP)

( * ) Notice: Subject to any disclaimer, the term of this patent is extended or adjusted under 35 U.S.C. 154(b) by 40 days.

(21) Appl. No.: 09/657,993

(22) Filed: Sep. 8, 2000

(51) Int. Cl.⁷ .................................................. H01S 3/00
(52) U.S. Cl. ....................................................... 372/38.04
(58) Field of Search ........................... 372/29.012, 38, 372/38.04, 38.01, 86, 38.02, 83; 323/222

(56) References Cited

U.S. PATENT DOCUMENTS

| | | | |
|---|---|---|---|
| 4,802,185 A | * 1/1989 | Kyusho | 372/86 |
| 4,837,773 A | * 6/1989 | Wakata et al. | 372/86 |
| 5,072,191 A | * 12/1991 | Nakajima et al. | 372/38 |
| 5,293,390 A | * 3/1994 | Furuya et al. | 372/38 |
| 5,313,487 A | * 5/1994 | Fujikawa et al. | 372/86 |
| 5,757,831 A | * 5/1998 | Kmetec et al. | 372/38 |
| 5,936,988 A | * 8/1999 | Partlo et al. | 372/38 |
| 6,184,662 B1 | * 2/2001 | Yabuuchi et al. | 323/222 |
| 6,188,144 B1 | * 2/2001 | Kawasuji | 372/38.08 |
| 6,240,112 B1 | * 5/2001 | Partlo et al. | 372/38 |

* cited by examiner

Primary Examiner—Leon Scott, Jr.
(74) Attorney, Agent, or Firm—Welsh & Katz, Ltd.

(57) ABSTRACT

A peaking capacitor layout in which a discharge energy is not lowered even when peaking capacitors are decreased in their capacitance, increased in their number and disposed in a plurality of rows. The discharge energy is uniformly distributed to obtain a stable laser power. A peaking capacitor group in a first row formed of a plurality of peaking capacitors and a peaking capacitor group in a second row formed of a plurality of peaking capacitors are disposed in a plurality of rows (two rows) in a direction in which a length of a loop changes. The capacitance of the peaking capacitors forming the second row having a long loop is adjusted to be smaller than that of the peaking capacitors forming the first row having a short loop. And, the capacitance of the peaking capacitors in the first and second rows are adjusted so that the distribution of the capacitance of the peaking capacitors becomes uniform along the longitudinal direction of the discharge electrodes.

2 Claims, 7 Drawing Sheets

PEAKING CAPACITOR LAYOUT

BACKGROUND OF THE INVENTION

1. Field of the Invention

The present invention relates to a peaking capacitor layout used for a power-supply unit of a laser device.

2. Description of the Related Art

Recently, a lot of magnetic pulse compression circuits are used for the power-supply unit of a high power pulse laser device. The durability of main switches such as a thyratron and GTO is improved by using the magnetic pulse compression circuit. The magnetic pulse compression circuit of such a type is known described in Japanese Patent Application Laid-Open Publication No. 5-167158.

FIG. 10 shows a capacitance transit type magnetic pulse compression circuit used for the power -supply unit of a pulse laser device. As shown in FIG. 10, one of plates of peaking capacitor Cp1 is connected to discharge electrode 2 (cathode) through electric signal line 11a. The other plate of the peaking capacitor Cp1 is connected to another discharge electrode 3 (anode) through electric signal line 11b. In other words, the peaking capacitor Cp1 is electrically connected in parallel to the discharge electrodes 2, 3 through loop (current circuit) Lp1. The discharge electrodes 2, 3 are disposed in a laser medium.

FIG. 11 shows a layout of peaking capacitors Cp1. FIG. 11 is a diagram showing the discharge electrodes 2, 3 viewed from their sides.

As shown in FIG. 11, a plurality of peaking capacitors Cp1 having the same capacitance are disposed in a row along the longitudinal directions of the discharge electrodes 2, 3. The peaking capacitors Cp1 are connected to conductor 9. The conductor 9 is electrically connected to the discharge electrode 2. A discharge is caused in discharge area 4 between the discharge electrodes 2, 3.

Then, when an unshown main switch is turned on in FIG. 10, electric charges are supplied to and accumulated in charging capacitor Cn. When a time integral of a recharging voltage of the charging capacitor Cn reaches a limiting value which depends on a predetermined characteristic of magnetic switch Ln, the magnetic switch Ln is saturated, and the electric charges are transferred to and accumulated in the peaking capacitor Cp1. The recharging voltage of the peaking capacitor Cp1 increases as the transfer of electric charges progresses. Then, when the recharging voltage of the peaking capacitor Cp1 reaches a predetermined main discharge start voltage, a laser gas between the discharge electrodes 2, 3 is undergone an electric breakdown, and the main discharge is started. The laser medium is excited by the main discharge, and laser light is emitted in several nsec.

Then, the recharging voltage of the peaking capacitor Cp1 is quickly lowered by the main discharge, and the state before starting the charging is resumed after a lapse of a predetermined period of time.

Such a discharge operation as above is repeated by the switching operation of the main switch, and a pulse laser is oscillated at a predetermined repetition frequency (pulse oscillation frequency).

FIG. 5 shows the waveform of electric current i flowing through the loop Lp1 of the peaking capacitors Cp1 and the discharge electrodes 2, 3. The horizontal axis in FIG. 5 indicates time t. The electric charges are transferred from the peaking capacitors Cp1 to the discharge electrodes 2, 3 over time $\tau 1$, and the discharge is caused between the electrodes 2, 3. The area surrounded by the current waveform in FIG. 5 corresponds to a magnitude (laser light power) of discharge energy between the discharge electrodes 2, 3.

The discharge energy becomes larger as a rising inclination of the current waveform becomes large and the transition time $\tau 1$ becomes shorter. It is known that the rising inclination of the current waveform can be made larger and the transition time $\tau 1$ shorter by reducing the capacitance of each peaking capacitor Cp1 in FIG. 11.

To decrease the capacitance of each peaking capacitor Cp1 in FIG. 11, it is necessary to increase the number of peaking capacitors Cp1 in one row so to have the same discharge energy.

But, the peaking capacitors Cp1 must be disposed in two rows in order to arrange many of them because the discharge electrodes 2, 3 have a limited length in their longitudinal directions.

FIG. 12 shows an example that the peaking capacitors Cp1 are disposed in a first row close to the discharge electrode 2 and the peaking capacitors Cp2 are disposed in a second row distant from the discharge electrode 2. The respective peaking capacitors Cp1, Cp2 have the same capacitance in FIG. 12 which is smaller than that of the each peaking capacitor Cp1 of FIG. 11.

FIG. 6 shows the waveform of electric current i flowing through the loop Lp1 of the peaking capacitors Cp1 in the first row and the discharge electrodes 2, 3 and the waveform of electric current i flowing through loop Lp2 of the peaking capacitors Cp2 in the second row and the discharge electrodes 2, 3 of FIG. 12.

The loop Lp2 is longer than the loop Lp1 because the peaking capacitors Cp2 in the second row are distant from the discharge electrodes 2, 3 as compared with the peaking capacitors Cp1 in the first row.

Because the peaking capacitors Cp1 in the first row of FIG. 12 have the capacitance smaller than the peaking capacitors Cp1 of FIG. 11, the electric charges are transferred to the discharge electrodes 2, 3 with an arising inclination larger and transition time $\tau 2$ smaller than those of the current waveform of FIG. 5. But, the peaking capacitors Cp2 in the second row of FIG. 12 have the capacitance smaller than the peaking capacitors Cp1 of FIG. 11, but the rising inclination of the current waveform is small and transition time $\tau 3$ becomes larger than the transition time $\tau 2$ because the loop Lp2 is longer than the loop Lp1.

Therefore, there is a problem that the discharge energy is canceled in the time $\tau 3 - \tau 2$ and the discharge energy is lowered.

Accordingly, it is a first object of the present invention to prevent the discharge energy from lowering even when the peaking capacitors are disposed in a plurality of rows with their capacitance lowered and their quantity increased.

Where the peaking capacitors are disposed in two rows as shown in FIG. 12, the disposed intervals and quantity of the peaking capacitors become different between the first and second rows. The disposed intervals of the peaking capacitors Cp2 in the second row of FIG. 12 are larger than those of the peaking capacitors Cp1 in the first row, and the quantity of the peaking capacitors Cp2 in the second row is smaller than that of the peaking capacitors Cp1 in the first row.

Therefore, the peaking capacitors Cp1, Cp2 have nonuniform capacitance at the respective points in the longitudinal directions of the discharge electrodes 2, 3. The nonuniform capacitance of the peaking capacitors Cp1, Cp2 results in nonuniform dispersion of the discharge energy.

FIG. 9 is a conceptual diagram showing dispersion of discharge A when it was caused by the layout shown in FIG. 12.

As shown in FIG. 9, because the peaking capacitors Cp1, Cp2 have nonuniform capacitance at the respective points in the longitudinal directions of the discharge electrodes 2, 3, the discharge A also has a nonuniform dispersion as indicated by slanted lines. The nonuniform discharge means that stable laser power cannot be obtained.

Accordingly, it is a second object of the present invention to make the discharge energy dispersion uniform so to obtain stable laser power even when the peaking capacitors are lowered their capacitance, increased their quantity and disposed in a plurality of rows.

OBJECTS AND SUMMARY OF THE INVENTION

It is a first object of the first aspect of the invention to prevent discharge energy from lowering even when the peaking capacitors are decreased their capacitance, increased their quantity and disposed in a plurality of rows.

The first aspect of the invention is a peaking capacitor layout in a laser device, which includes discharge electrodes disposed in a laser medium and a single-row peaking capacitor group having a plurality of peaking capacitors which are electrically connected in parallel to the discharge electrodes through a current circuit and also disposed in a row along a longitudinal direction of the discharge electrodes, in which a discharge is caused across the discharge electrodes by transferring electric charges from the respective peaking capacitors forming the single-row peaking capacitor group to the discharge electrodes in a predetermined transition time to excite the laser medium, wherein:

the single-row peaking capacitor group is disposed in plural numbers in a direction in which a length of the current circuit varies, and a capacitance of each of the peaking capacitors forming a row with a longer current circuit is adjusted to be smaller than that of the peaking capacitors forming a row with a shorter current circuit so to reduce a transition time difference of the peaking capacitors in the respective rows.

According to the first aspect of the invention, the peaking capacitor group in the first row consisting of the plurality of peaking capacitors Cp1 and the peaking capacitor group in the second row consisting of the plurality of peaking capacitors Cp2 are disposed in a plurality of rows (two rows) in the directions that the loop Lp1 (indicated by a broken line) and the loop Lp2 (indicated by an alternate long and short dash line) have a different length as shown in FIG. 1.

The capacitance of the peaking capacitors Cp2 forming the second row with the long loop Lp2 is adjusted to be smaller than that of the peaking capacitors Cp1 forming the first row with the short loop Lp1.

FIG. 7 shows a waveform of current i flowing through the loop Lp1 of the peaking capacitors Cp1 in the first row and the discharge electrodes 2, 3 and a waveform of current i flowing through the loop Lp2 of the peaking capacitors Cp2 in the second row and the discharge electrodes 2, 3 of FIG. 1. The loop Lp2 is longer than the loop Lp1 because the peaking capacitors Cp2 in the second row are distant from the discharge electrodes 2, 3 as compared with the peaking capacitors Cp1 in the first row.

The peaking capacitors Cp1 in the first row of FIG. 1 have capacitance smaller than the peaking capacitors Cp1 of FIG. 11, so that the electric charges are transferred to the discharge electrodes 2, 3 at a larger rising inclination in shorter transition time $\tau 2$ than the current waveform of FIG. 5. Here, the peaking capacitors Cp2 in the second row of FIG. 1 are adjusted to have capacitance smaller than the peaking capacitors Cp1 in the first row of FIG. 1. Because the peaking capacitors Cp2 in the second row have small capacitance, the peaking capacitors Cp2 in the second row have the same transition time as the transition time $\tau 2$ of the peaking capacitors Cp1 in the first row though the loop Lp2 is longer than the loop Lp1. Therefore, the cancellation of the discharge energy as shown in FIG. 6 does not take place, and the discharge energy can be prevented from lowering.

It is a second object of a second aspect of the invention to make a discharge energy dispersion uniform so to enable to obtain stable laser power even when the peaking capacitors are decreased their capacitance, increased their quantity and disposed in a plurality of rows.

The second aspect of the invention is directed to the first aspect of the invention, wherein the capacitance of the peaking capacitors forming the peaking capacitor groups of the two or more rows is adjusted so to make a capacitance dispersion of the peaking capacitors uniform along the longitudinal direction of the discharge electrodes.

According to the second aspect of the invention, the capacitance of the peaking capacitors Cp1, Cp2 in the first and second rows is adjusted so to be uniformly dispersed along the longitudinal directions of the discharge electrodes 2, 3 as shown in FIG. 3. Specifically, the peaking capacitors Cp2 in the second row are disposed at the same intervals as those of the peaking capacitors Cp1 in the first row, and the quantity of the peaking capacitors Cp2 in the second row is adjusted to be the same as the peaking capacitors Cp1 in the first row.

Therefore, the peaking capacitors Cp1, Cp2 have the same capacitance at the respective points along the longitudinal directions of the discharge electrodes 2, 3. The discharge energy dispersion becomes uniform because the peaking capacitors Cp1, Cp2 have the uniform dispersion of capacitance. Thus, stable laser power can be obtained.

DETAILED DESCRIPTION OF THE PREFERRED EMBODIMENTS

Embodiments of the peaking capacitor layout according to the present invention will be described with reference to the accompanying drawings.

Figure 3:
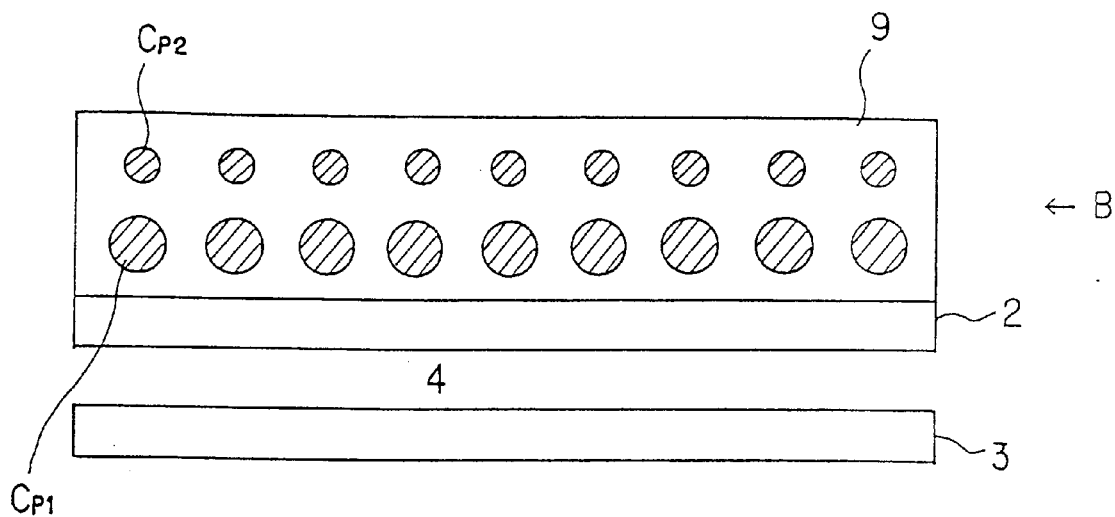
FIG. 3 is a diagram showing a first example of a peaking capacitor layout.

FIG. 3 shows a first example of the peaking capacitor layout. FIG. 3 is a diagram corresponding to FIG. 11 and FIG. 12. Outer diameters of the peaking capacitors Cp1, Cp2 of FIG. 3 and FIG. 4 correspond to their capacitance.

As shown in FIG. 3, conductor 9 having substantially the same length as the discharge electrodes 2, 3 is disposed along their longitudinal directions. The conductor 9 is electrically connected to the discharge electrode 2. The conductor 9 is comprised of the peaking capacitor group in the first row consisting of the plurality of peaking capacitors Cp1 and the peaking capacitor group in the second row consisting of the plurality of peaking capacitors Cp2.

Here, the capacitance of the peaking capacitors Cp1, Cp2 in the first and second rows is adjusted so that the peaking capacitors Cp1, Cp2 have a uniform capacitance dispersion along the longitudinal directions of the discharge electrodes 2, 3. Specifically, the peaking capacitors Cp2 in the second row are disposed at the same intervals as the peaking capacitors Cp1 in the first row, and the quantity of the peaking capacitors Cp2 in the second row is adjusted to be the same as the peaking capacitors Cp1 in the first row. Thus, the peaking capacitors Cp1, Cp2 at the respective points along the longitudinal directions of the discharge electrodes 2, 3 have a uniform capacitance dispersion.

Figure 1:
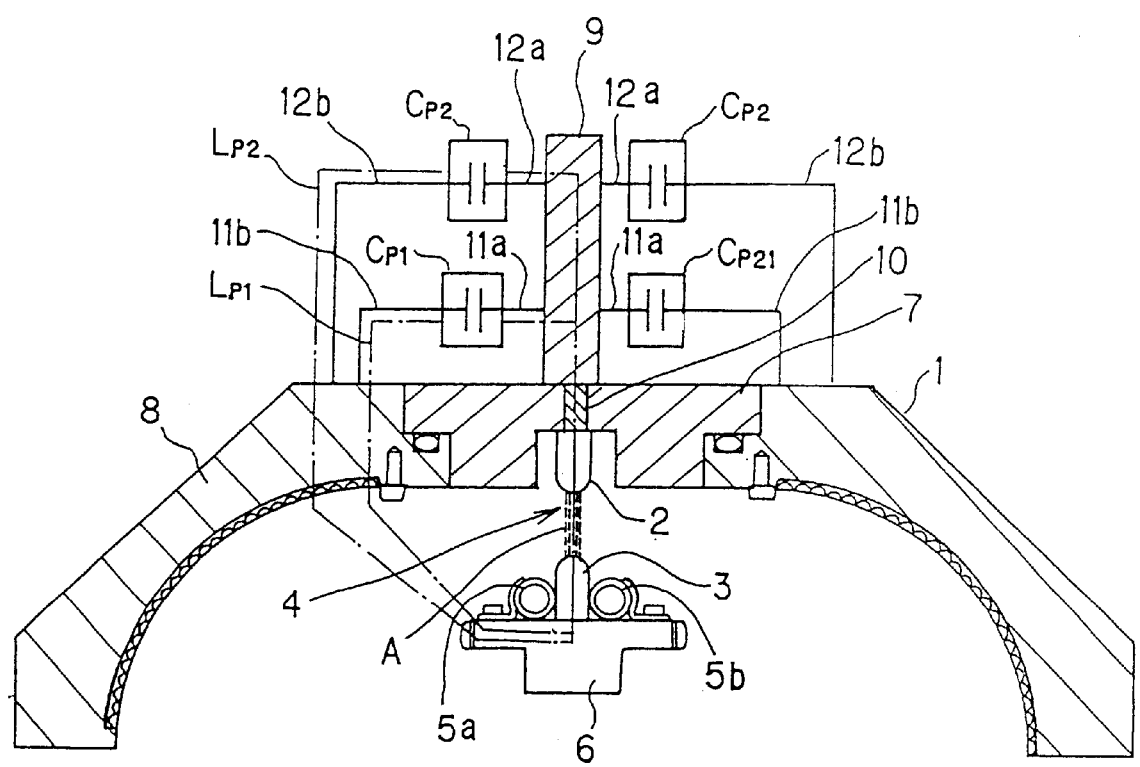
FIG. 1 is a diagram showing a structure example of a cross section of a laser chamber.

FIG. 1 is a sectional diagram of laser chamber 1 viewed from arrow B in FIG. 3.

As shown in FIG. 1, what is assumed in this embodiment is a discharge excitation type laser device which causes a main discharge after ultraviolet light is preionized by a corona discharge.

A laser gas to be the laser medium is filled in the laser chamber 1. The discharge electrode 2 (cathode) and the discharge electrode 3 (anode) are vertically disposed in pair within the laser chamber 1 to cause the main discharge. When the main discharge A is caused in the discharge area 4 between the discharge electrodes 2, 3, the laser medium is excited to emit the laser light. Specifically, the ultraviolet light produced by the excitation of the laser medium is resonated by an unshown resonator so to be amplified and then emitted as the laser light from the laser chamber 1.

The discharge electrode 2 is electrically connected to conductor 10 which forms the wall of the laser chamber 1. The conductor 10 is electrically connected to the conductor 9 which is disposed on the top of the laser chamber 1. The conductor 10 is electrically separated from conductor 8 by means of insulator 7. The insulator 7 and the conductor 8 form the wall of the maser chamber 1.

The discharge electrode 3 is electrically connected to the conductor 6. Preionization electrodes 5a, 5b which cause a preionization in the discharge area 4 are disposed on either side of the discharge electrode 3.

One of plates of each of the peaking capacitors Cp1 forming the first row is electrically connected to a lower part of the conductor 9 through electric signal line 11a. The other plate of each of the peaking capacitors Cp1 forming the first row is electrically connected to the conductor 8 through electric signal line 11b.

Similarly, one of the plates of each of the peaking capacitors Cp2 forming the second row is electrically connected to an upper part of the conductor 9 through electric signal line 12a. The other plate of each of the peaking capacitors Cp2 forming the second row is electrically connected to the conductor 8 through electric signal line 12b.

The peaking capacitors Cp2 forming the second row are disposed at a higher level than the peaking capacitors Cp1 forming the first row. Therefore, the loop Lp2 of the peaking capacitors Cp2 forming the second row and the discharge electrodes 2, 3 has a length longer than that of the loop Lp1 of the peaking capacitors CP1 forming the first row Lp1 and the discharge electrodes 2, 3.

According to a difference in length between the loops Lp2, Lp1, the capacitance of the peaking capacitors Cp2 forming the second row is adjusted to be smaller than that of the peaking capacitors Cp1 forming the first row.

The power supply unit of the laser device of FIG. 1 has the same capacitance transit type magnetic pulse compression circuit as described with reference to FIG. 10.

Figure 10:
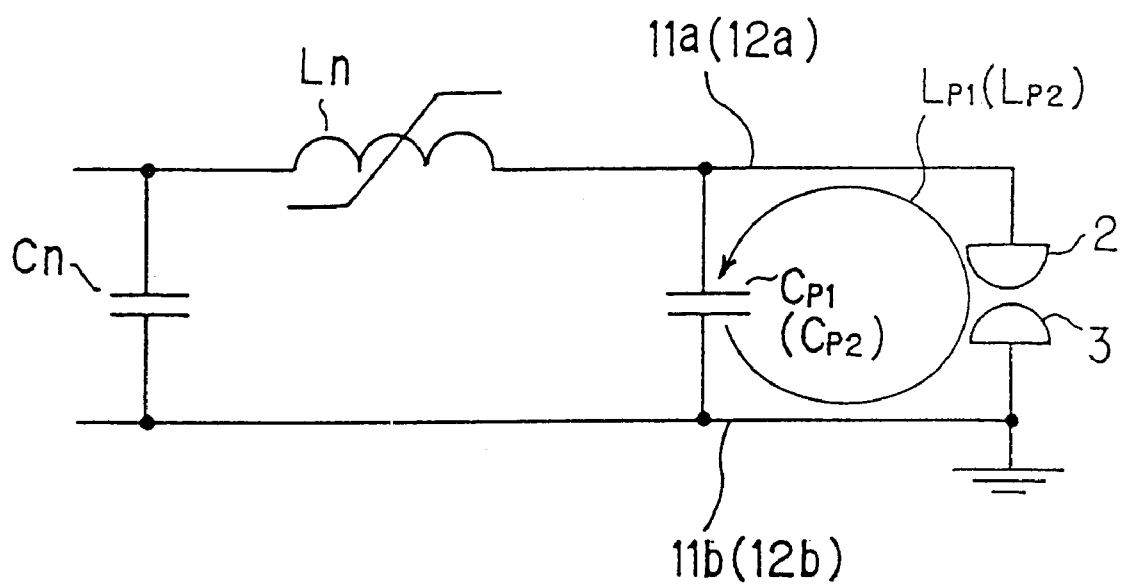
FIG. 10 is a circuit diagram showing a magnetic pulse compression circuit.

In other words, the peaking capacitors Cp1, Cp2 are electrically connected in parallel to the discharge electrodes 2, 3 through the loops Lp1, Lp2 as shown in FIG. 10.

Then, when an unshown main switch is turned on in FIG. 10, electric charges are supplied to and accumulated in the charging capacitor Cn. Then, when a time integral of a recharging voltage of the charging capacitor Cn reaches a limiting value which depends on a predetermined characteristic of the magnetic switch Ln, the magnetic switch Ln is saturated, and the electric charges are transferred to and accumulated in the peaking capacitors Cp1, Cp2. The recharging voltage of the peaking capacitors Cp1, Cp2 increases as the transfer of electric charges progresses. Then, when the recharging voltage of the peaking capacitors Cp1, Cp2 reaches a predetermined main discharge start voltage, the laser gas between the discharge electrodes is undergone an electric breakdown, and the main discharge is started. The laser medium is excited by the main discharge, and the laser light is emitted in several nsec.

Then, the recharged voltages of the peaking capacitors Cp1, Cp2 are sharply lowered owing to the main discharge and resumes the state before the recharging was started after a lapse of a predetermined time period.

Such a discharge operation is repeated by the switching operation of the main switch, so that the pulse laser is oscillated at a predetermined repetition frequency (pulse oscillation frequency).

Figure 7:
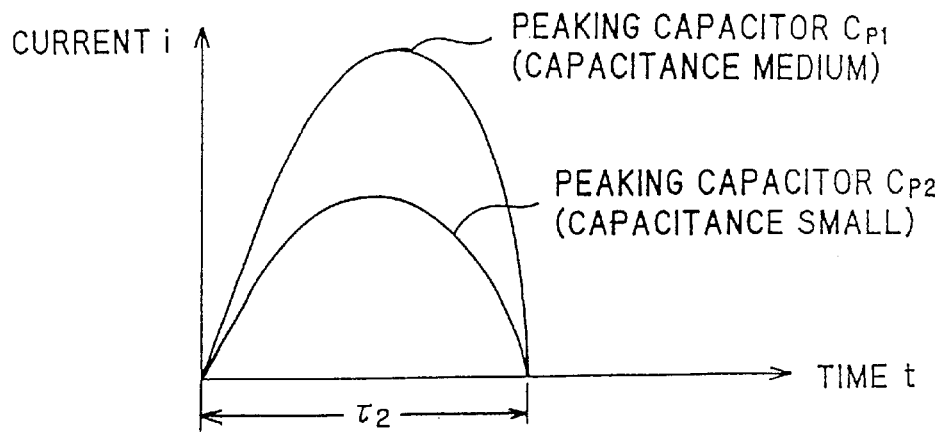
FIG. 7 is a diagram showing current waveforms in the peaking capacitor layout of the present invention.

FIG. 7 shows a waveform of electric current i flowing through the loop Lp1 of the peaking capacitors Cp1 in the first row and the discharge electrodes 2, 3 and a waveform of electric current i flowing through the loop Lp2 of the peaking capacitors Cp2 in the second row and the discharge electrodes 2, 3 of FIG. 1. The peaking capacitors Cp2 in the second row are distant from the discharge electrodes 2, 3 as compared with the peaking capacitors Cp1 in the first row, so that the loop Lp2 is longer than the loop Lp1.

Figure 5:
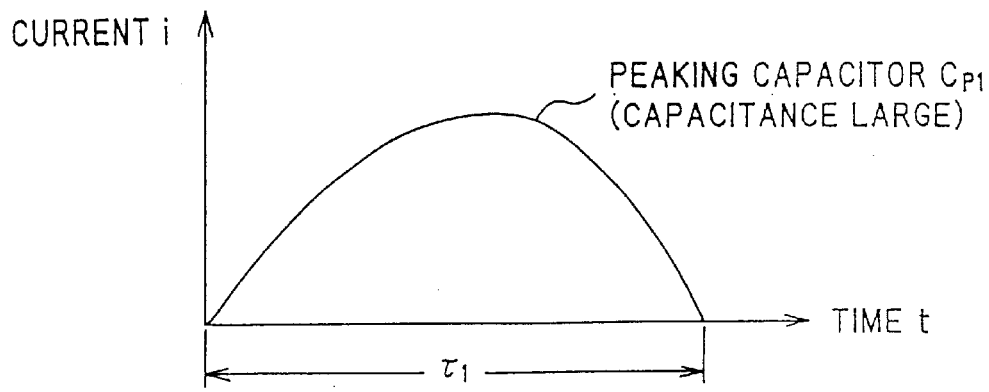
FIG. 5 is a diagram showing a current waveform in a conventional peaking capacitor layout.
Figure 6:
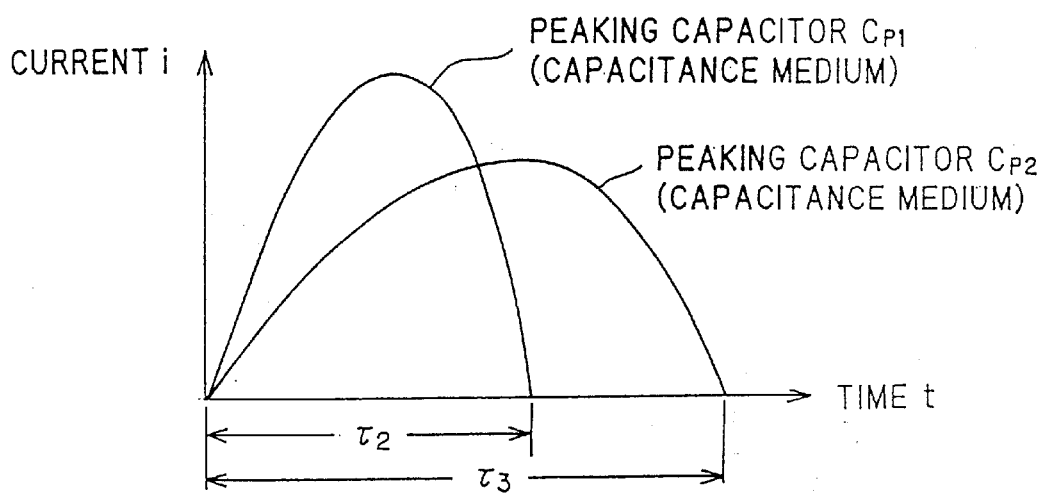
FIG. 6 is a diagram showing current waveforms in the conventional peaking capacitor layout.
Figure 11:
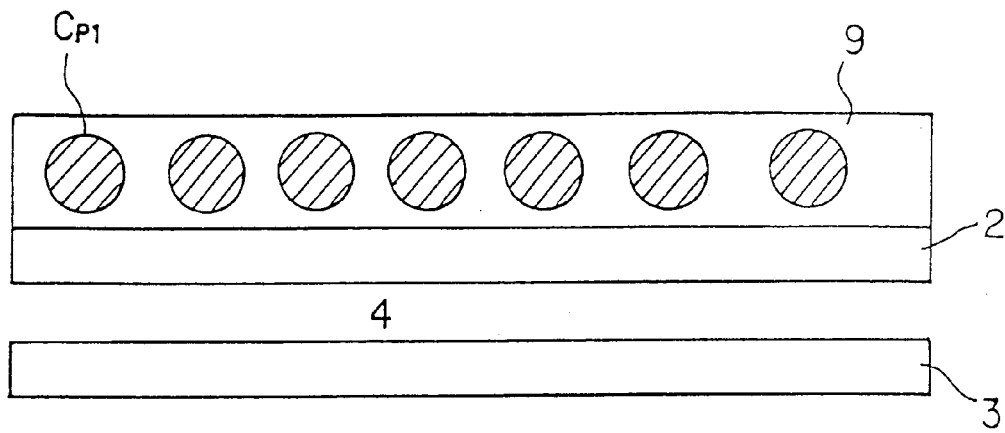
FIG. 11 is a diagram showing the conventional peaking capacitor layout.

The capacitance of the peaking capacitors Cp1 in the first row of FIG. 1 is smaller than that of the peaking capacitors Cp1 of FIG. 11, so that the electric charges are transferred to the discharge electrodes 2, 3 with a rising inclination larger and transition time $\tau 2$ shorter than the current waveform of FIG. 5. Here, the capacitance of the peaking capacitors Cp2 in the second row of FIG. 1 is adjusted to be smaller than that of the peaking capacitors Cp1 in the first row of FIG. 1. Because the capacitance of the peaking capacitors Cp2 in the second row is small, the transition time of the peaking capacitors Cp2 in the second row become the same as the transition time $\tau 2$ of the peaking capacitors Cp1 in the first row even when the loop Lp2 is longer than the loop Lp1. Therefore, the cancellation of the discharge energy as shown in FIG. 6 is not caused, and the discharge energy can be prevented from lowering.

As described above, the discharge energy can be prevented from lowering according to this embodiment even if the peaking capacitors are lowered their capacitance, increased their quantity and disposed in a plurality of rows such as the first and second rows.

And, the arrangement intervals of the peaking capacitors Cp2 in the second row are the same as those of the peaking capacitors Cp1 in the first row in this embodiment, and the quantity of the peaking capacitors Cp2 in the second row is adjusted to be the same as that of the peaking capacitors Cp1 in the first row.

Therefore, the peaking capacitors Cp1, Cp2 at the respective points in the longitudinal directions of the discharge electrodes 2, 3 have a uniform size of capacitance. The discharge energy dispersion becomes uniform because the peaking capacitors Cp1, Cp2 have the uniform dispersion of capacitance. Thus, stable laser power can be obtained.

Figure 8:
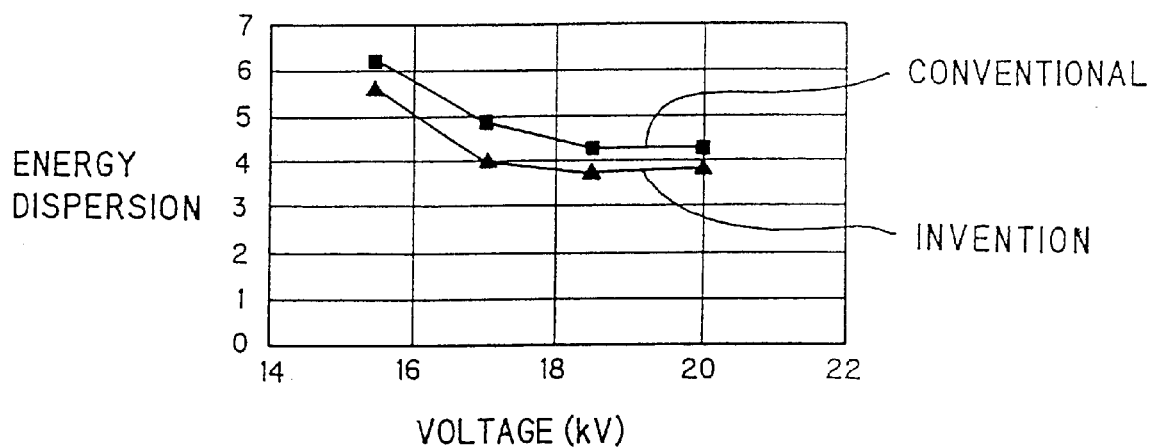
FIG. 8 is a graph showing a difference in effects between the present invention and prior art.
Figure 9:
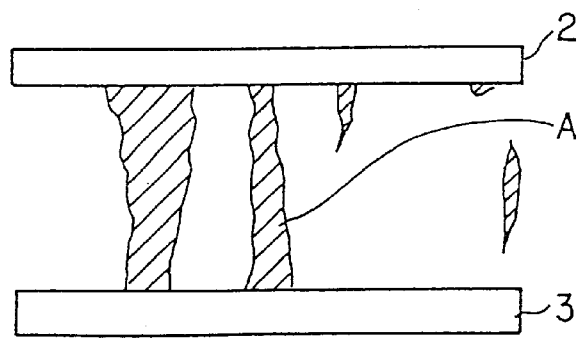
FIG. 9 is a diagram conceptually showing a discharge dispersion in the conventional peaking capacitor layout.
Figure 12:
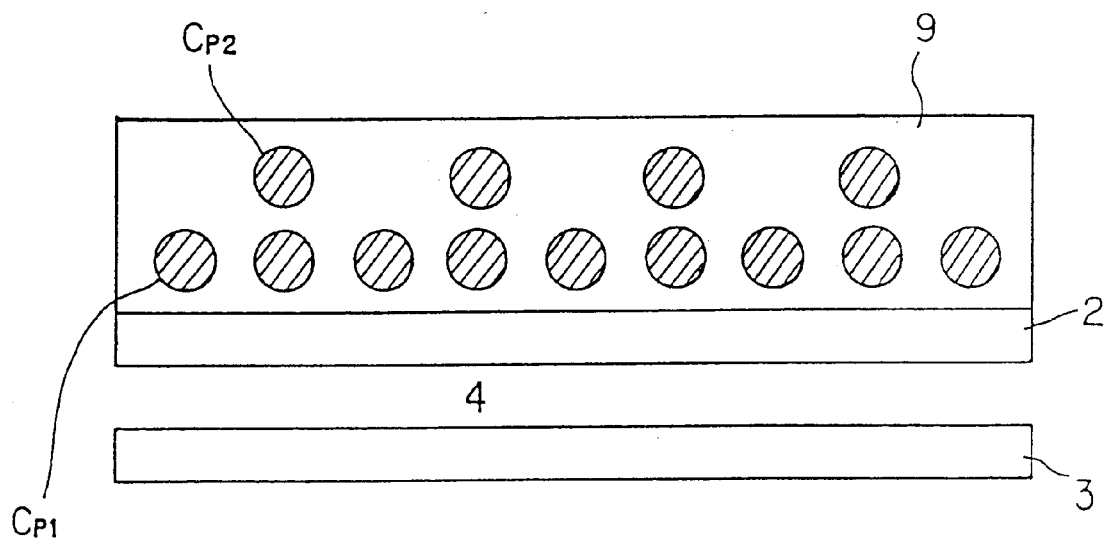
FIG. 12 is a diagram showing the conventional peaking capacitor layout.

FIG. 8 shows a difference in effects between the peaking capacitor layout according to the present invention shown in FIG. 3 and the conventional peaking capacitor layout shown in FIG. 12. The horizontal axis in FIG. 8 indicates a power supply voltage. And, the vertical axis indicates variations in discharge energy at respective points in the longitudinal directions of the discharge electrodes 2, 3. It is seen from FIG. 8 that the variations in the discharge energy are smaller in the layout according to the present invention than those in the discharge energy in the conventional layout regardless of a level of the power supply voltage. The variations in the discharge energy have been improved in the figure by about 0.5 to 1%.

Then, a modified example of the present invention will be described.

Figure 4:
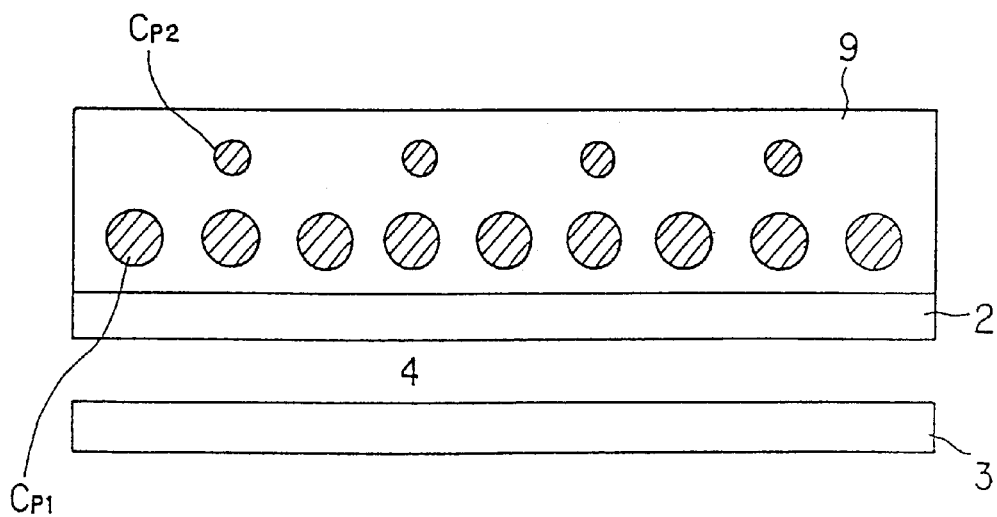
FIG. 4 is a diagram showing a second example of the peaking capacitor layout.

According to the present invention, the arrangement intervals of the peaking capacitors Cp2 in the second row may be changed to be larger than those of the peaking capacitors Cp1 in the first row, and the quantity of the peaking capacitors Cp2 in the second row may be made smaller than that of the peaking capacitors Cp1 in the first row as shown in FIG. 4. The capacitance of the peaking capacitors Cp2 forming the second row is adjusted to be smaller than that of the peaking capacitors Cp1 forming the first row. Therefore, the current waveforms of the peaking capacitors Cp1, Cp2 are the same as those shown in FIG. 7, and the cancellation of the discharge energy can be eliminated. And, the discharge energy can be prevented from lowering.

Figure 2:
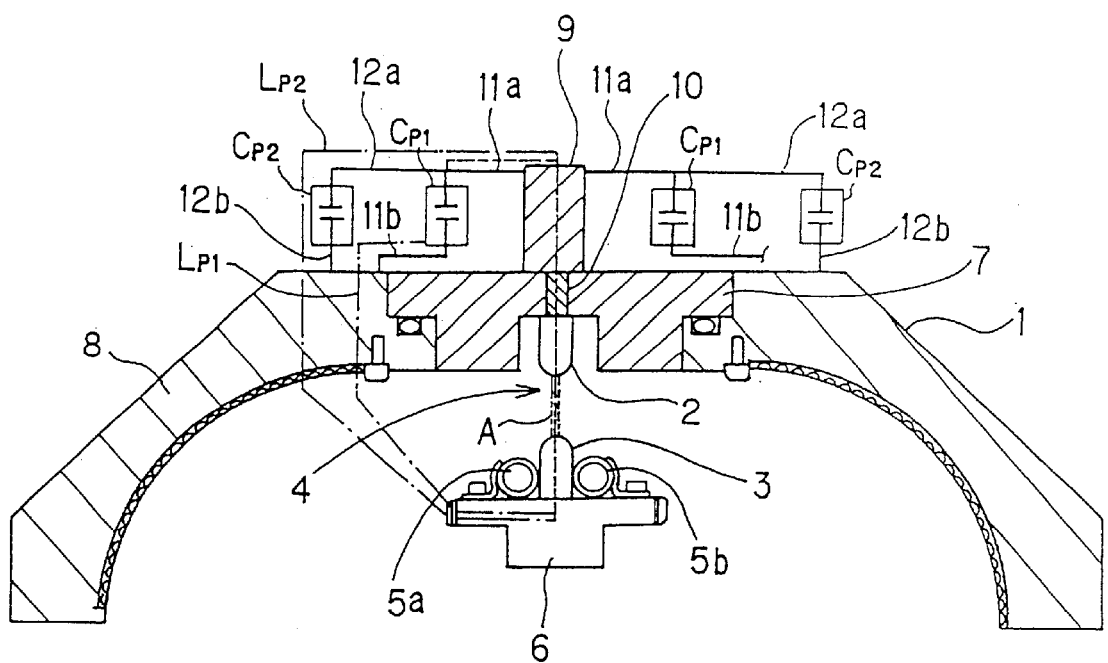
FIG. 2 is a diagram showing another structure example of a cross section of the laser chamber.

The peaking capacitors Cp1, Cp2 are vertically disposed on the conductor 9 above the discharge electrode 2 in FIG. 1 but may be disposed on either side of the conductor 9 above the discharge electrode 2 as shown in FIG. 2. In the embodiment of FIG. 2, the loop Lp2 of the peaking capacitors Cp2 forming the second row and the discharge electrodes 2, 3 is longer than the loop Lp1 of the peaking capacitors Cp1 forming the first row and the discharge electrodes 2, 3. And, according to a difference in length of the loops Lp2, Lp1, the capacitance of the peaking capacitors Cp2 forming the second row is adjusted to be smaller than the capacitance of the peaking capacitors Cp1 forming the first row. Therefore, in the embodiment of FIG. 2, the current waveforms of the peaking capacitors Cp1, Cp2 also become the same as those shown in FIG. 7 in the same way as in the embodiment of FIG. 1, and the cancellation of the discharge energy can be eliminated. And the discharge energy can be prevented from lowering.

In the embodiments described above, the peaking capacitor groups are disposed in two rows along the longitudinal directions of the discharge electrodes 2, 3 but can also be disposed in three or more rows.

What is claimed is:

1. A peaking capacitor layout in a laser device, which includes discharge electrodes disposed in a laser medium and a single-row peaking capacitor group having a plurality of peaking capacitors which are electrically connected in parallel to the discharge electrodes through a current circuit and also disposed in a row along a longitudinal direction of the discharge electrodes, in which a discharge is caused across the discharge electrodes by transferring electric charges from the respective peaking capacitors forming the single-row peaking capacitor group to the discharge electrodes in a predetermined transition time to excite the laser medium, wherein:

the single-row peaking capacitor group is disposed in plural numbers in a direction in which a length of the current circuit varies, and a capacitance of each of the peaking capacitors forming a row with a longer current circuit is adjusted to be smaller than that of the peaking capacitors forming a row with a shorter current circuit so to reduce a transition time difference of the peaking capacitors in the respective rows.

2. The peaking capacitor layout in a laser device according to claim 1, wherein the capacitance of the peaking capacitors forming the plurality of rows of peaking capacitor groups is adjusted so to make a capacitance dispersion of the peaking capacitors uniform along the longitudinal direction of the discharge electrodes.

* * * * *